APPARATUS FOR PRODUCTION OF SOUND RECORDINGS

Filed April 3, 1956

5 Sheets-Sheet 1

INVENTOR.
C. R. FINE
BY Darby & Darby
ATTORNEYS

APPARATUS FOR PRODUCTION OF SOUND RECORDINGS

Filed April 3, 1956 5 Sheets-Sheet 2

INVENTOR.
C. R. FINE
BY Darby & Darby
ATTORNEYS

April 10, 1962 C. R. FINE 3,029,316

APPARATUS FOR PRODUCTION OF SOUND RECORDINGS

Filed April 3, 1956 5 Sheets-Sheet 3

INVENTOR.
C. R. FINE
BY Darby & Darby
ATTORNEYS

April 10, 1962 C. R. FINE 3,029,316
APPARATUS FOR PRODUCTION OF SOUND RECORDINGS
Filed April 3, 1956 5 Sheets-Sheet 4

INVENTOR.
C. R. FINE
BY Darby & Darby
ATTORNEYS

April 10, 1962 C. R. FINE 3,029,316

APPARATUS FOR PRODUCTION OF SOUND RECORDINGS

Filed April 3, 1956 5 Sheets-Sheet 5

INVENTOR.
C. R. FINE
BY Darby & Darby
ATTORNEYS

United States Patent Office 3,029,316
Patented Apr. 10, 1962

3,029,316
APPARATUS FOR PRODUCTION OF SOUND RECORDINGS

C Robert Fine, Tomkins Cove, Rockland County, N.Y.

Filed Apr. 3, 1956, Ser. No. 575,911
9 Claims. (Cl. 179—100.2)

The present invention relates to the art of production of sound motion picture films and sound recordings and is more specifically concerned with improved method and apparatus useful in the production of such films and recordings.

In the case of motion picture films it has become customary to make several different sound recordings which are finally combined into a single sound track for printing together with the photographed film to form a master or release print. For example, one recording might be of the background music; a second recording may be of special sound effects; while a third recording may be of the spoken dialogue. In addition, it is customary for the dialogue recording to have also simultaneous sound effects which are created directly by the actors as part of the scene being enacted.

In many situations it is desirable to separate such simultaneous sound effects from the dialogue. For example, where foreign language dialogue is to be dubbed in for the original dialogue, it is necessary to preserve the simultaneous sound effects while eliminating the original dialogue.

The present invention provides a process and apparatus for readily accomplishing this desired purpose of separating portions of a recording from other portions thereof, and producing a recording from which all desired portions of the original recording may be later reproduced. According to one form of this invention, the several sound records forming components of the ultimate master sound track used in printing the motion picture release print are recorded in parallel tracks on the same film or tape record, so as to maintain permanent alignment and synchronism. Where desired, these recordings may be on magnetic tape, and accompanied by an optical recording, in the manner disclosed and claimed in my copending patent application, Serial No. 548,697 for Method and Apparatus for Use in Producing Sound Motion Picture Films, filed November 23, 1955. In addition to these recorded tracks, a further cue track is simultaneously recorded on the same film or tape, by means of apparatus constituting one aspect of the present invention. Where the recording medium is a sprocketed film or tape, this cuing track may be desirably located outside the sprocket holes so as not to reduce the portion of the medium available for regular recording. This cuing track is utilized by means of other apparatus constituting part of the invention, automatically to produce a new recording, suppressing desired portions of any of the original recording on that meduim.

It is accordingly an object of the present invention to provide apparatus and processes for producing a cuing record synchronized with an existing record and for automatically suppressing desired portions of such existing sound record under the influence of that cuing record.

According to another phase of the present invention, a special cuing track is provided and used for proper synchronization of a sound track with a motion picture film or other sound record.

In the production of sound motion picture films, problems frequently arise in connection with the synchronization of the recorded sound track and the photographed picture film, which are made separately and must be properly combined in producing the final motion picture master or release print. In the case of scenes involving merely spoken dialogue, this problem is not severe since the recording of the sound portion and the photographing of the picture portion of the final film are often conducted simultaneously and it is merely necessary to provide means for permitting the sound recording to be properly positioned relative to the frames of the photographed picture in the final printing. This has been customarily done by a so-called "slate stick." In this case, just before the actual scene is photographed, a person appears before the camera with a pair of sticks which are slapped together. The picture frame which shows the sticks just coming together is then readily co-ordinated with the sharp pulses caused on the simultaneously recorded sound track by the clapping of one stick against the other.

However, particularly in the case of musical scenes, it has become customary to pre-record the sound so as to permit obtaining the highest degree of excellence of the audible performance, without being burdened by the effort of acting for the camera. Thus the performing artist is permitted to make the sound recording under optimum conditions for producing the best quality of recording, and any portions of the recording which may be below par can be readily replaced by new sections spliced into the finished recording, which is generally made on magnetic tape to retain high quality of reproduction. Thereafter, in photographing the scene, the performer will listen to a reproduction of the pre-recorded work and will perform in synchronism with the pre-recorded work to keep the appearance of making a fresh recording, although in fact no sound recording need then be made except for checking purposes. In such cases the slate stick is inadequate to provide the proper guide marks for co-ordinating the sound track with the photographed film, since the photographing of the slate stick would have no concomitant effect on the pre-recorded performance.

Also where it is desired to replace one scene of the photographed film with another, either in editing or in correcting an error or for any other reason, it has heretofore been necessary to start the entire sequence over again from the beginning, since only at the beginning can there be readily obtained any cuing mark for co-ordinating sound with film.

The present invention is also directed toward a simple and highly desirable solution to these problems. According to this invention, a source of audio tone is provided which, for example, may be of a frequency of 3000 cycles per second, called a "slating tone." In making a sound recording, the musical director actuates controls which electrically superpose bursts or pulses of this slating tone on the electrical sound signals being recorded, at the beginning of the sound record. These bursts are desirably of higher amplitude than the recorded intelligence and, for example, may be 20 decibels above the normal recording level. When beginning to photograph the performance, the camera is directed toward one or more incandescent lamps, and is started substantially at the same time that the pre-recorded scene sequence is begun to be reproduced.

The bursts of slating tone just described automatically operate through apparatus forming part of the present invention to cause the lamps to flash abruptly. According to one desirable feature of the present invention, these lamps are maintained on a partially energized basis at all times, such as, for example, just glowing faintly red, at which they will have 20% or less of their maximum illumination output. In this way the bursts of slating tone are operative to cause these lamps to flash almost instantaneously without the normal delays incident to the thermal lag in incandescent lamps, at the same instant that the slating tone is reproduced from the sound record.

The flashing of these lamps is of course photographed by the camera and thereafter it is merely necessary to position the picture frames showing these flashes in proper relation with the sound pulses appearing on the sound track representing the bursts of slating tone. In this way the sound track and picture sequence may be properly coordinated.

In addition, at suitably chosen intermediate points along the sound track, the musical director can place coded bursts of slating tone wherever desired, so as to designate different sections of the sequence or composition being recorded. Thereafter, if any one portion has to be rephotographed, it is merely necessary to begin to run the sound track through a reproducer at the point at which the slating bursts appear, and then have these slating bursts again flash the slating lights to give a visual cue mark to be coordinated with the sound track mark. The flashing will be coded the same as the bursts of slating tone.

In general it will be desirable to make recordings on multiple tracks simultaneously. For example, one track may have the musical accompaniment alone. A second track may have the singing or vocal portions alone. A third track may have a composite of the musical and vocalization plus the slating tone. These multiple tracks are recorded simultaneously side by side on the same film or tape. Desirably the "Opti-mag" system described and claimed in my said copending application Serial No. 548,697 is used, which additionally provides an optical track side by side with the magnetic tracks. In this way the vocalization and musical accompaniments are separately available for use in making the master sound record for motion picture release prints, without the undesirable presence of slating tone, and are available together for actuation of the slating lights. Also, a visual copy of the sound record is available for registration with the photographed sequence.

Other objects and advantages of the present invention will become more fully apparent from consideration of the following description of preferred embodiments thereof, taken in conjunction with the appended drawings, in which:

FIG. 9 is a schematic circuit diagram of an apparatus for producing a cuing record for slating or the like;

Figures 1, 2, 3:
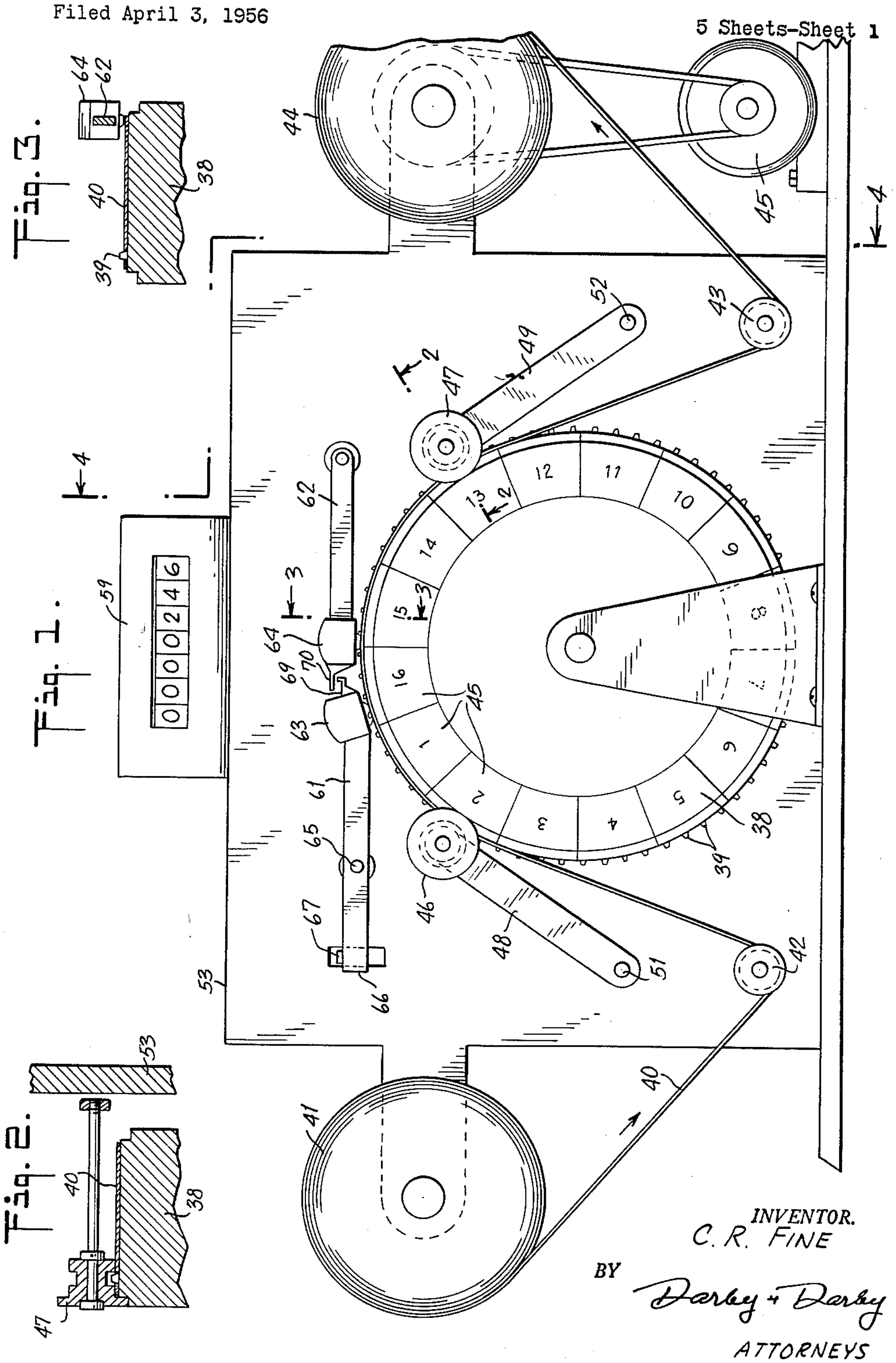
FIG. 1 is a front elevation view of apparatus for applying a cuing track.
FIG. 2 is a fragmentary cross-sectional view of an element of FIG. 1, viewed along along line 2—2 thereof.
FIG. 3 is a fragmentary cross-sectional view of a portion of the apparatus of FIG. 1, viewed alongside 3—3 thereof.
Figure 4:
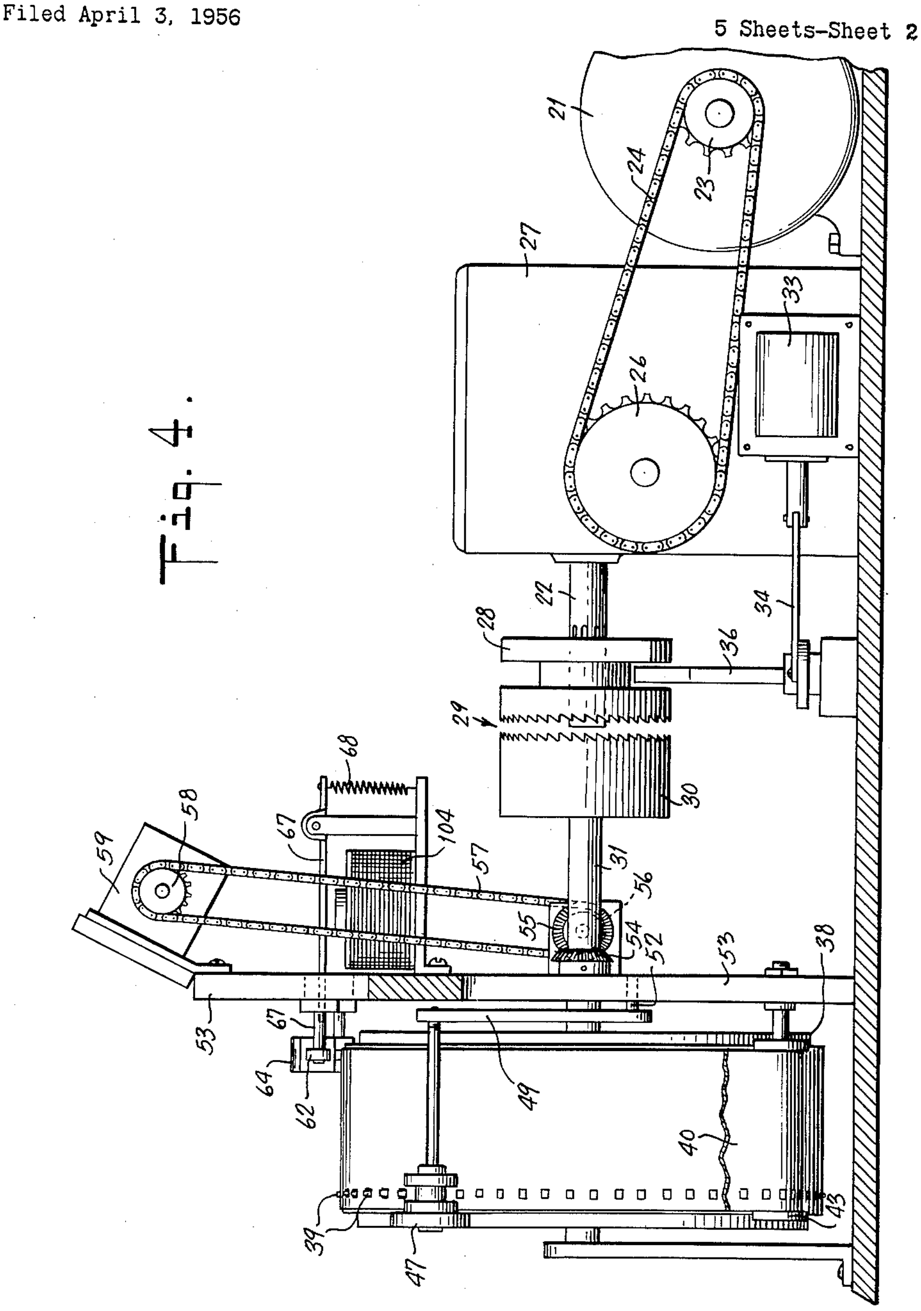
FIG. 4 is a side elevation view of the apparatus of FIG. 1.

Referring to the drawings, FIG. 1 shows a front elevation view of the apparatus used in forming the cusing trac kwhile FIG. 4 shows the same apparatus in side elevation view.

A motor 21 continuously rotates a shaft 22 by means of a sprocket 23 secured to the shaft of motor 21 and driving a chain 24 which in turn drives a larger sprocket 26 forming the input to a speed-reducing mechanism 27 whose output is coupled to shaft 22. Shaft 22 is connected to one member 28 of a dog clutch 29, whose other member 30 is connected to an output shaft 31. Clutch 29 is normally disengaged and is caused to engage by means of a solenoid 33 and a linkage 34, 36 so arranged that when solenoid 33 is energized the clutch member 28 is slid to the left to engage clutch member 30 thereby forming a direct drive from shaft 22 to shaft 31. Shaft 31 passes freely through a main panel 53 and is directly connected to a drum 38 carrying sprocket teeth 39 for engaging a film 40 which is preferably of the standard 35 mm. movie film size. Film 40 carries a magnetic coating and serves as a magnetic tape for recording sound thereon. The film 40 passes from a supply reel 41 over an idler pulley 42, around drum 38 and over an idler pulley 43, to the take-up reel 44, which has a take-up motor 45 coupled thereto. The pair of weighted rollers 46, 47 mounted on respective arms 48, 49 pivotally mounted at 51, 52 to main panel 53 serve to maintain the film 40 in engagement with the surface of the drum 38 with the normal sprocket holes of the film 40 engaging the sprocket teeth 39.

Also secured to the shaft 31 is a bevel gear 54 which engages a second bevel gear 55 connected to a sprocket 56 engaging a drive chain 57 which drives a second sprocket 58 secured to the input shaft of a revolution counter 59. In this way, the revolution counter indicates the number of complete revolutions of shaft 31 and hence of drum 38. The face of drum 38 is divided into sixteen equal intervals 45 and the speed of rotation of the shaft 31 and drum 38 are so designed, in relation to the drum diameter, that the linear speed of the film 40 at the periphery of the drum 38 is 10 feet per minute, which is one-ninth the normal speed of a motion picture film, namely, 90 feet per minute. The circumference of drum 38 is selected to be equal to the length of 16 frames of 35 mm. movie film, or one foot. Therefore when driven by shaft 31, drum 38 will rotate one each six seconds. The face of drum 38 is marked off into 16 equal intervals, as shown at 45, which are preferably marked by Nos. 1 to 16 respectively, so that each frame of the 35 mm. film (corresponding to 4 sprocket holes) is in register with a respective one of these intervals. This permits any portion of the film 40 to be accurately specified by the number of feet of length plus number of frames (up to 16) from the starting point. Since each revolution of shaft 31 represents one linear foot of film 40, counter 59 is a direct-reading footage indicator.

Also pivotally mounted on a front panel 53 are a pair of arms 61, 62 which respectively bear a recording head 63 and an erasing head 64 in proper relationship to the desired cuing track of the magnetic coating on the film 40. The film 40 preferably has a magnetic coating over its entire width. In customary manner, respective longitudinal strips of this coating can serve as separate sound recording tracks, and by customary procedure three such tracks are used in normal recording. A fourth track, serving as the cuing track of the present invention, is used either inside or outside the usual sprocket hole area of the film 40, and heads 63, 64 are aligned with that cuing track, illustratively shown as outside the sprocket holes.

Head 63 has its arm 61 pivoted at 65 and with its other end 66 engaging a member 67 passing through panel 53. Member 67 is the armature for a solenoid 104 and is pivoted at 68 and normally urged upward and away from recording head arm 61, by spring 68. Upon energization of solenoid 104 member 67 moves downward upon arm 61, and raises head 63. Fixed to head 63 is a projecting arm 69 which, upon raising of head 63, engages a similar arm 70 on head 64 so as to raise head 64 also. When solenoid 104 is de-energized, both heads 63 and 64 fall to the operative position relative to film 40.

Figure 5:
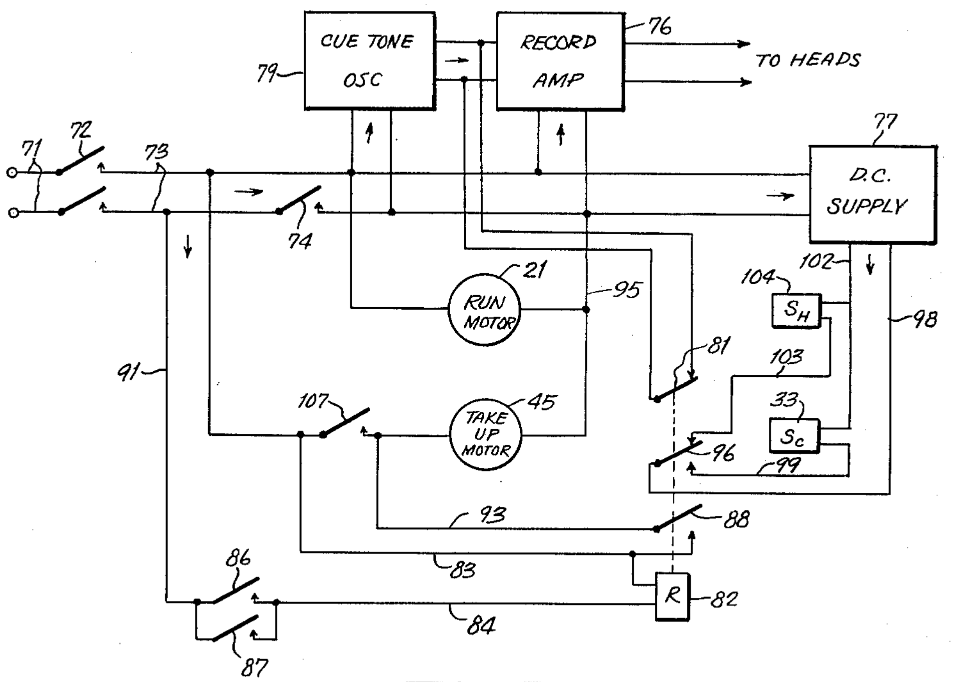
FIG. 5 is a schematic power circuit diagram of the apparatus of FIGS. 1–4.
Figure 6:
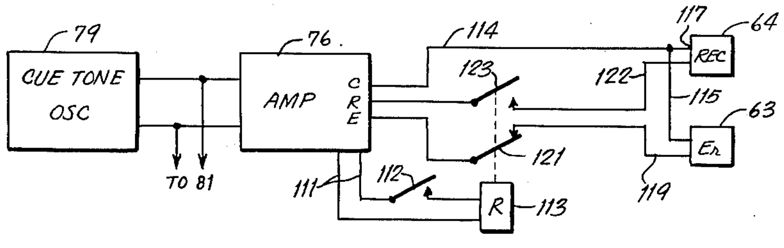
FIG. 6 is a schematic audio circuit diagram of the apparatus of FIGS. 1–4.

FIG. 5 shows a schematic electrical circuit diagram of the system of FIGS. 1 to 4. The normal 115-volt alternating current power supply, indicated by lines 71, is connected through a master switch 72 to the leads 73 supplying the various units of the system. The leads 73 are connected through a single-pole single-throw switch 74 to energize various units of the apparatus, such as the recording amplifier 76, a conventional 6-volt direct current power supply 77, and the run motor 21. Accordingly, when switch 74 is closed, the recording amplifier 76, the 6-volt supply 77 and motor 21 remain continuously energized. It will therefore be seen that the motor 21 is running continuously, avoiding possible delay in the starting up and acceleration of the motor 21. The audio circuit of the recording amplifier 76 is shown in FIG. 6, described below. It is fed by an oscillator 79 whose output is normally short-circuited by a pair of muting contacts 81 on a relay 82, whose energizing coil is connected across the power leads 73 by means of wires 83, 84 through one of two switches, either a "record" foot switch 86 or toggle switch 87. If either switch 86 or switch 87 is closed, relay 82 becomes energized. In this condition its contacts 81 open the oscillator muting circuit so that the oscillator output is continuously applied to the recording amplifier 76 and through the amplifier to the recording head, as described below relative to FIG. 4. At the same time, the relay contacts 88 close, which completes the circuit from power leads 73 through, conductor 83, contacts 88, conductor 93, take-up motor 45 and conductor 95 back to the leads 73, so that the take-up motor 45 is energized. This motor is designed to operate at a high speed, such as 200 feet per minute, in the absence of drag, so as to provide a rapid traverse for the film whenever clutch 29 is disengaged. The third pair of contacts 96 of relay 82 close the circuit from the 6-volt power supply through conductor 98, relay contacts 96, conductor 99, clutch solenoid 33, and conductor 102 back to the power supply 77, so as to excite the clutch solenoid. This, of course, couples run motor 21 to drum 38, causing take-up motor 45 to slow down to the speed permitted by run motor 21 and maintaining the film in tension. At the same time, since contacts 96 are of the double-throw type, they interrupt the circuit from power supply 77 through conductor 98, contacts 96 and conductor 103 to the head lift solenoid 104. In this way, when relay 82 is de-energized, the head lift solenoid 104 remains energized maintaining the heads 63, 64 away from the film. However, as soon as either the record foot switch 86 or the hand toggle switch 87 is actuated, the head lift solenoid 104 is de-energized and the clutch solenoid 33 is energized to start recording of the cuing tone signal. The further switch 107, either a hand or foot switch, short-circuits the contacts 88 of relay 82 so as to permit the take-up motor 45 to run continuously independently of relay 82, when desired, as when clutch 29 is disengaged, for high speed film traverse.

FIG. 6 shows an electrical schematic circuit diagram of the audio system. The cuing tone signal oscillator 79 has its output supplied to the input of recording amplifier 76, which provides a 6-volt D.C. output on leads 111 connected through a "record" push button switch 112 to a relay 113. The amplifier 76 has an "erase" output terminal E, a "record" output terminal R and a "common" output terminal C. The common terminal C is connected through lead 114 and lead 117 to one terminal of the recording head 64 and also through lead 115 to one terminal of the erasing head 63. The other terminal of erasing head 63 is connected through lead 119 and contacts 121 of relay 113 to the amplifier output terminal E. The second terminal of the recording head 64 is connected through lead 122, and contacts 123 of relay 113 to the amplifier terminal R. By this arrangement, whenever the button 112 is depressed, the recording output of amplifier 76 is supplied to the recording head 64 by the closing of contacts 123, while at the same time the erasing output of amplifier 76 is removed from the input to the erasing head 63. Conversely when the relay 113 is de-energized, as by releasing button 112, the recording head 64 is de-energized and the erasing head 63 is then energized.

The operation of the apparatus by which the cuing signal is made and recorded will now be described. The operator first closes the main switch 72 to supply power generally to the apparatus, and then closes switch 74, which at once energizes the record amplifier 76, oscillator 79, power supply 77, and run motor 21, which operates continuously. However, relay 82 is de-energized so that clutch solenoid 33 is de-energized, leaving clutch 29 disengaged. Similarly, head lift solenoid 104 is energized, so that heads 63, 64 are lifted from the film. The apparatus is now ready to operate, after a warming-up period for the electronic portions of the system.

The film is placed on the supply reel 41 and threaded around pulley 42, drum 38, pulley 43 and take-up reel 44. As already stated, the run motor 21 normally operates to rotate drum 38 at a speed of 10 revolutions per minute, each revolution corresponding to one foot so that a linear speed of 10 feet per minute is obtained. The face of drum 38 is divided into 16 divisions; since the one-foot circumference of drum 38 is equal to the length of 16 motion picture frames, each division of the drum periphery corresponds to one frame of the film. In threading the film onto the drum, the starting mark customarily placed on the film is placed opposite drum division No. 1, and the counter or footage indicator 59 is set to zero.

The operator is provided with a cuing sheet upon which appears exactly the positions of the sound effects which it is desired to retain while suppressing all dialogue. For example, this cuing sheet may indicate that a sound effect occurring at 26 feet, 4 frames from the start and continuing to 27 feet, 2 frames from the start, should be retained. The operator then runs the film 40 through the machine until the counter indicates 26 feet and he watches the divisions on the face of the drum to show exactly 2 frames from the beginning of the 26th foot of film. This is done by closing foot switch 86 or hand switch 87, to energize relay 82 and thereby actuate clutch 29 to drive drum 38 and film 40 at the speed of 10 feet per minute.

This speed is deliberately designed to be slow (one-ninth the regular speed of recording and reproduction of motion picture sound tracks) in order to permit an extremely accurate placement of the cuing signals. In order for these cuing signals to be of sufficient practical utility, it is required that they must be operative within a time interval of no more than 1/50 of one second at normal operating film speeds. This requires the cuing signal to be located within a distance of two sprocket holes or ½ frame along the film. With the film traversing the apparatus at the slow speed of 10 feet per minute, the operator can readily determine the instant when the exact proper point of the film passes over the top of drum 38, past the recording head. At that point, with the film continuing to travel at the slow speed of ten feet per minute, the operator presses his "record" switch 112 which then records the cuing tone signal on the recording channel of the film directly beside the portion of the original sound track which it is desired to retain. He maintains this switch 112 depressed until his footage and frame indicator shows that he has reached the end of the portion of the sound track to be retained. In the example indicated, this would be at position 27 feet, 2 frames. Thereupon the operator releases the switch 112, terminating the recording operation.

The film continues to travel at the same rate of ten feet per minute so long as the foot switch 86 is closed. In place of the foot switch 86 the operator may use the hand toggle switch 87 to maintain the film at the constant speed of 10 feet per minute. Where there are long intervals between sound effects to be retained or cued, the operator may actuate the feet switch 107 (preferably located alongside switch 86) while leaving the foot switch 86 or toggle switch 87 open. With these latter switches open of course the clutch solenoid is de-energized and the heads are lifted from the film, so that there is no impediment to the take-up motor 45 driving the film over the drum at high speed, such as of the order of 200 feet per minute. As the counter 59 approaches the desired position for the next sound effects to be retained or cued, the operator then shifts his foot from switch 107 to 86, thereby slowing down the film to ten feet per minute and permitting the operator to approach the desired point of recording at a slow speed so that he can accurately initiate commencement of the cuing record at the proper frame or sprocket hole as before.

As already indicated, the film speed during recording of the cuing signal, is approximately 1/9 normal speed during film reproduction. For this reason the frequency of the cuing signal derived from oscillator 79 is chosen to be substantially 1/9 the frequency at which the dialogue suppressing apparatus is intended to operate. A frequency of 312 cycles per second for oscillator 79 has been found highly satisfactory.

Figure 7:
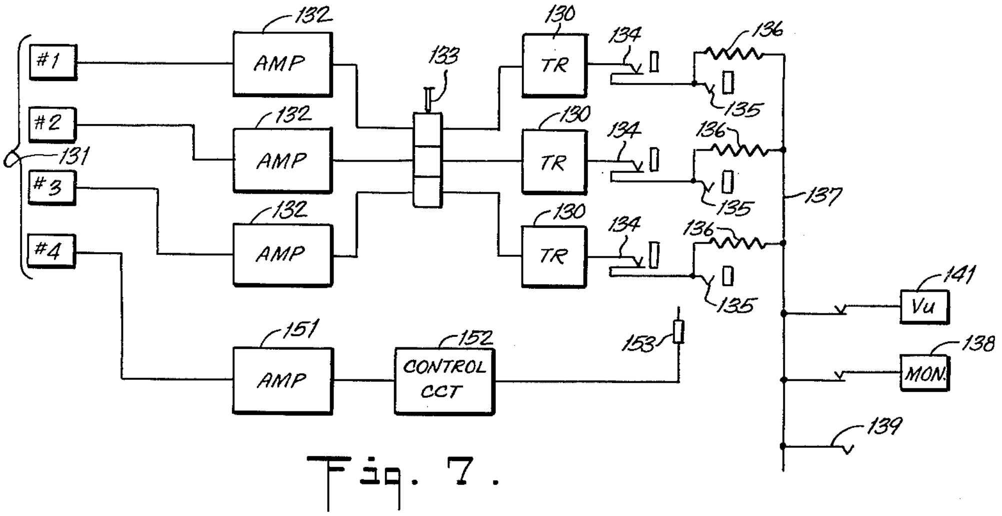
FIG. 7 is a schematic circuit diagram of apparatus using the cuing track made by the apparatus of FIGS. 1–6.

FIG. 7 shows a schematic of apparatus for performing the desired dialogue suppression. A multi-track magnetic tape reproducer is illustrated schematically at 131, having pick-ups marked #1, #2, #3 and #4, cooperating respectively with the three normal signal tracks and the cuing tracks. The outputs of the pick-ups #1, #2 and #3 are fed through respective amplifiers 132 to a common gain control 133, sometimes designated as a "stereo pad," and then through respective T-pad impedance transformers 130 to respective level-set jacks 134. These jacks 134 are connected in parallel with respective muting jacks 135. Tapped off from these muting jacks through respective isolating impedances 136, the pick-up output signals are then supplied to a common recording bus or channel 137.

This circuit as thus far described therefore permits the three outputs of pick-ups #1, #2 and #3 to be combined on a single bus 137, from which the combined outputs may be monitored by way of a monitor coupled to a monitor amplifier 138, recorded by a suitable recorder plugged in on a jack 139, and have its level indicated by a VU unit 141 plugged in on a further jack.

Pick-up #4 cooperating with the cuing channel is connected through a suitable amplifier 151 to a special control amplifier 152 described below in connection with FIG. 8. The pick-up #4 responds to the cuing signal recorded on the track #4 and serves to actuate a relay within the control amplifier 152 which opens a short circuit across the terminals of a muting plug 153. The manner in which this is accomplished is shown in FIG. 6, which is a schematic circuit diagram of the control amplifier 152. As already indicated, the cuing signal is recorded at a frequency of approximately one-ninth the desired frequency of operation of amplifier 152 and at a speed which is one-ninth the ordinary speed of reproduction of a sound motion picture film, namely at 10 feet per minute. In this way, when reproduced at 131 at normal speeds, the output of the pick-up #4 will be at the desired frequency, such as approximately 3000 cycles per second. This pick-up output is impressed on the input terminals 161 of FIG. 8 across which is connected the high value input resistor 162, such as of the order of 2 megohms. This input signal is impressed through a level-setting potentiometer 165 between the grid and cathode of an input tube 163, the cathode being in series with a cathode biasing and distortion-eliminating feedback resistor 164. The anode of tube 163 is connected to a source 180 of positive potential through a load resistor 167 and a peaking filter 168 formed by a coil 169 and condenser 170, which is set to peak at the frequency of the input signal, namely, at 3000 cycles per second. Preferably, this filter arrangement is designed to produce peaking of at least 12 decibels at that frequency. The screen grid of tube 163 is provided with positive potential from source 180 through a voltage-dropping resistor 171 with the usual by-passing condenser 172. The output of tube 163 is derived from its anode by way of a coupling condenser 173, and is impressed on the input grid of a second tube 174. Its cathode is provided with an adjustable positive bias by means of a potentiometer 175 connected between the positive potential source 180 and ground. Between the grid of tube 174 and ground is connected a further peaking filter formed by a pair of resistors 182 and 183 in series, with a condenser 184 shunting resistor 183. The screen grid of tube 174 is connected to the positive source 180 through a voltage-dropping resistor 177 without by-passing. The plate of tube 174 is connected through a current meter 178 and a relay 179 to the positive source 180. Relay 179 may have its coil by-passed by a condenser 181 to reduce possible chattering of its contacts. The contacts 182 of relay 179 are normally closed, being opened upon energization of the coil 179, so as to open-circuit muting plug 153 connected thereto.

It is important in this kind of circuit that the relay response be extremely rapid. In the usual motion picture film traveling at 90 feet per minute (18 inches per second), there will be 24 frames passing per second; each frame has 4 sprocket holes, making 96 sprocket holes passing per second. In order that the control action of the present system be fast enough to provide satisfactory results it is necessary that the dialogue suppressor operate within no more than two sprocket holes, that is, there must be complete transition from complete suppression to complete transmission of signal (or vice versa) in a period corresponding to 2 sprocket holes, which is approximately 1/50 of a second. It would be impossible to do this as a practical matter with rectifying arrangements, since the necessary filters accompanying such rectifier arrangements provide a time lag far greater than the time interval required for response. For this reason the present circuit has particular advantage, since it requires no filtering of rectified output and can operate substantially instantaneously, well within the time intervals required. In operation, tube 174 has its cathode bias adjusted by means of potentiometer 175 so as to be nearly at cut-off. This is indicated by meter 178 which normally would have a current of the order of 3 milliamperes. When an input cuing signal is impressed on terminals 161 and amplified by tube 163 with its peaking filters, the positive half-cycles of input signal at the grid of tube 174 will increase substantially instantaneously correspondingly increasing the average plate current of tube 174; for example, the current of tube 174 may jump almost immediately to a value of the order of 100 milliamperes, sufficient to cause the relay contacts 182 to open within a period of the order of 1/100 of one second after the commencement of the 3000 cycle signal impressed on terminals 161, and hence unshorting plug 153 within the required time.

By inserting the plug 153 into any of the muting jacks 135, the output of a respective one of channels 1, 2 and 3 can be suppressed, at times and intervals determined by the cuing signal recorded on track #4. This arrangement, for example, permits track #1 of film 40 to contain dialogue with synchronized sound effects; track #2 may contain background or special non-synchronized sound effects, and track #3 may be merely musical background. With all three of these recorded on respective tracks on the same film, then by plugging the muting plug 153 into the top jack 134 (corresponding to channel #1) the apparatus responds to the cuing signal on pick-up #4 to suppress all dialogue in the output at recording bus 137, while leaving the synchronized sound effects, special background effects and musical background without change. In this way, for example, for foreign recordings, it is merely necessary to dub in the foreign language voices where desired, leaving the musical background and the synchronized effects as originally recorded. In addition, if the original tracks #1, #2 and #3 were previously properly mixed so as to be at proper relative levels, this relation remains unchanged at the output at bus 137. Similarly, where in some instances it is desirable or necessary to produce and record musical background locally, the present system makes it possible to suppress the musical background, leaving all sound effects which may be present on the same track, by providing a proper cuing track.

After the cued recording is produced, having the normal three tracks plus the cuing track, it constitutes a permanent master recording useful for almost any desired purpose in the art of motion picture reproduction. Thus, the three normal tracks can be used as the master recordings from which release prints may be fabricated. At the same time, where foreign language dubbing is desired, the cuing signal track permits the master record to be used to produce a new master having the dialogue suppressed but with all other components. It will be understood that the cuing signal is maintained in fixed registry with respect to all of the sound tracks by being recorded on the same film or tape with them, so that there is no possibility of any loss of synchronism or registry between the cuing track and the sound tracks.

Accordingly, this phase of the present invention has provided an extremely simple, straightforward and highly useful method and apparatus for suppressing any desired portions of sound tracks under the influence of a separate cuing track. This method includes the operation of running the recording of the sound tracks at a speed slow enough that the cuing signal can be placed accurately on a cuing track on the same record at the desired point. The cuing signal is recorded on the same medium as the sound tracks, at a fraction of the desired frequency of reproduction of the cuing signal, that fraction being the same as the ratio of that slower speed to the normal speed of reproduction of the recording. Thereafter, the recording with the cuing signal track and several sound tracks thereon is reproduced in separate channels at normal speed, and the cuing signal is utilized to mute or short out a desired sound track, except for the intervals of time during which the cuing signal occurs, thereby suppressing all undesired portions of the sound track.

It will be apparent that the cuing system of the present invention is useful for many purposes. For example, it can be used for eliminating "clicks," which might be caused by splices in a recording. It could also be used to delete portions of a sound track where corrections are to be substituted.

As described above, the system responds to a recorded cuing signal to pass a portion of a recording for the duration of that cuing signal. From another viewpoint, the absence of the cuing signal may be considered as a cut-out signal, which suppresses the recording for its duration. Separate cuing and cut-out signals may of course be used, in a manner obvious from the foregoing description.

Another aspect of the present invention is concerned with the use of a similar cuing track for "electronic slating." This aspect of the invention has particular application to the production of motion picture films or sequences having vocal music, although it is not limited thereto.

It has become customary in order to attain a high quality of sound recording in motion pictures, to have the performer make a magnetic tape recording of the work being performed in advance of filming the scene during which this performance is supposed to take place. Thereafter the recording is reproduced simultaneously with the filming of the scene, and the performer repeats his performance in timed synchronism with the reproduction of the pre-recorded performance, for the purpose solely of filming. Any sound recording made during the actual filming is used only for checking purposes; the pre-recording is used to make the ultimate motion picture release print.

It happens quite frequently that during the filming of the performance scenes or sequences may be of inferior quality or mishaps may occur, in either case requiring the replacement of a portion of the filmed sequences. When this portion is re-photographed it is important to be able to readily determine the portion of the pre-recorded performance which must be reproduced together with this refilmed sequence, which may occur far from the beginning of the performance.

In the past it was necessary to go back to the beginning of the recorded performance and to re-film the entire sequence, since only at the beginning was there any synchronizing mark by which the pre-recorded sound track could be properly aligned with the filmed sequence, as is required to produce the composite motion picture film with its sound track.

In the past this was done by the process of "slating." A person would appear before the camera at the beginning of the sequence with a pair of sticks in his hands, which he would sharply clap together. The sound thus produced would be recorded together with the remainder of the performance, and the sharp impulses appearing on the sound track could be readily aligned with the motion picture frame showing the sticks first touching one another. However, where pre-recorded performances are used, this becomes more difficult and it is particularly difficult to align properly the beginning of a sequence to be patched into the film.

The foregoing difficulties are avoided by another aspect of the present invention. In this instance during the recording of the original performance the producer or director is enabled to apply cuing signals which are used in the manner to be described below.

A first recording of the performance is made under normal conditions, providing a magnetic tape or other similar recording of the entire performance. This is done under optimum conditions and becomes the master recording to be used later in making the master print or release print of the motion picture.

From this master recording is made a working recording on which the director can superpose desired cuing signals. This is done by means of apparatus schematically illustrated in FIG. 9.

Figure 9:
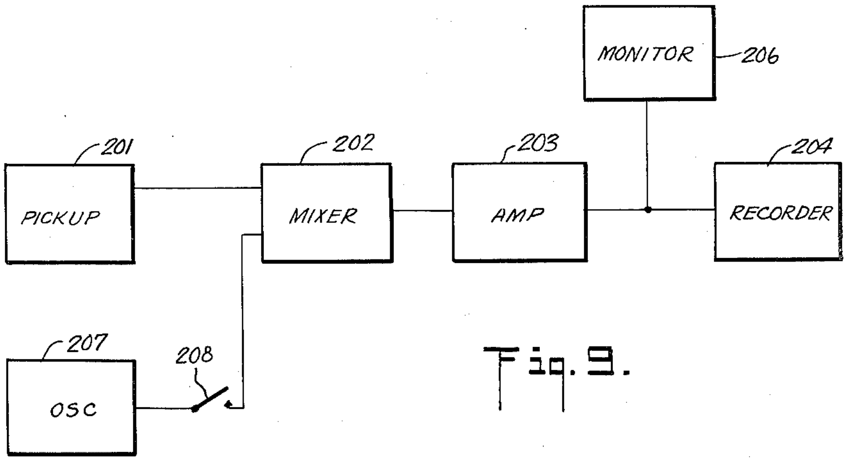

As shown in FIG. 9, a pick-up or reproducer 201 serves to produce electrical sound signals from the master recording just referred to. Its output is supplied through a mixer 202 to an amplifier 203 and thereby to a further magnetic recorder 204. A monitor 206 serves to indicate what is being recorded by the recorder 204. A cuing tone oscillator 207 is provided, preferably at 3000 cycles per second or other appropriate audible frequency and its output is supplied through a switch 208 (such as the push-button type) to a second input to mixer 202. In this way the cuing tone is superposed on the output of pick-up 201 and is recorded simultaneously therewith by recorder 204 to produce a composite cued recording as a result.

Preferably this composite cued recording is of the engraved disk type, having the usual laterally cut spiral grooves. During the process of making this recording by recorder 204, an operator is continuously in attendance and each time that he hears cuing signals reproduced by monitor 206 he momentarily increases substantially the pitch of the spiral recording. For example, in place of the normal groove separation of the order of 100 grooves to the inch, he may increase this pitch to ¼ inch between successive grooves, merely for one or two revolutions of the disk. This provides a visual indication on the recording of the location of the cuing tones.

The working recording thus produced by recorder 204 is then used for the actual slating and synchronizing of vocalization with picture. This is done by means of the apparatus shown in FIG. 10 comprising the actual slating operations. The working recording is reproduced by means of a pick-up 211 feeding an amplifier 212, an equalizer 213, a matching attenuator 214, and thereby the cued performance is supplied to a suitable loudspeaker or other reproducer 216. The sound thus reproduced is heard by the performer, and he then enacts the scene during actual photographing while vocalizing in synchronization with the sound he hears from speaker 216.

Figure 8:
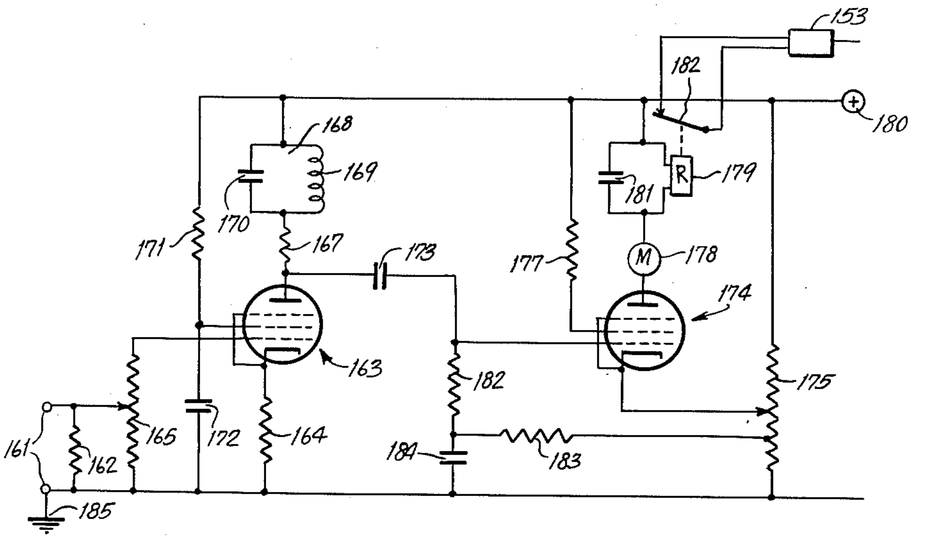
FIG. 8 is a schematic circuit diagram of the control circuit of FIG. 7.

At the same time, the output of amplifier 212 is supplied to the control amplifier 217, which is of the type shown in FIG. 8, providing twenty or more decibels of sharp peaking at the frequency of the slating or cuing tone. Since this slating tone has been recorded at much higher level than the audio signal, and since the first tube 163 of FIG. 8 and the second tube 174 are both substantially cut off in the absence of any input signal of the slating frequency, the amplifier 217 will respond substantially to nothing but the slating tone. Relay 179 of amplifier 217 is shown separately in FIG. 10, and its contacts are bridged by a resistor 218. A conventional power circuit 219 is connected through resistor 218 (or through the contacts 182 when closed) to respective single-throw switches 221, 222 and thereby to the incandescent slating lamps 223, 224. Switches 221 and 222 provide individual control over the respective slating lamps 223, 224, permitting either or both of the lamps to be used under the control of these switches.

Resistor 218 provides an important aspect of the invention in that it permits a "standby" current to flow through the lamps 223 and 224 at all times. This current is sufficient to create only a dim glow in the lamps 223 and 224, but provides a substantial part of the normal excitation of these lamps. Accordingly, when contacts 182 of relay 179 are closed, the lamps 223 and 224 will be excited to full brilliance without the usual delay or inertia caused by the thermal lag of the lamps 223 and 224. It will thus be clear that each time a burst of slating tone is picked up by the pick-up 211, amplifier 211 will close relay 179, to flash the lamps 223 and 224.

In making the working recording referred to above, the program director by means of push-button 208 of FIG. 9 can insert a slating signal wherever he may desire. For example, at the beginning of a recorded work he may place either a single burst of slating tone or a coded burst which can identify the particular performance or sequence in process. Thereafter at each appropriate position in the recorded work, such as after each group of measures or bars of music at which the recorded work may alter its character, or other proper musical intervals, a new slating signal is recorded. Each of these signals can be coded, as by an appropriate number of bursts of slating tone which can be placed in groups to form digits of a number. Preferably these bursts are very short and are placed in rhythm with the musical work so that upon reproduction they do not interfere so radically with the reproduction from speaker 216 as to throw the performer off beat or out of rhythm. Nevertheless they remain fully audible for their useful purpose.

Figure 10:
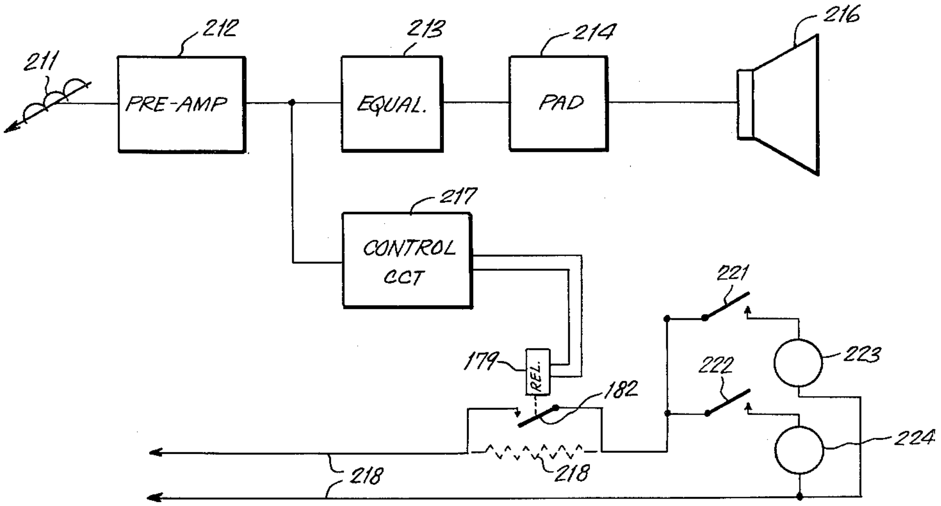
FIG. 10 is a schematic circuit diagram of a slating circuit utilizing the record produced by the apparatus of FIG. 9.

After the working recording is made in this manner, it is reproduced by the apparatus of FIG. 10. At the beginning of the working recording the first slating signals prior to the actual recording will serve to actuate the slating lamps 223 and 224 in the manner indicated, thereby providing on the motion picture film visual indications corresponding to the audible signals of the recording which, by use of the "Opti-Mag" system of the above mentioned application Serial No. 548,697, provides a visible indication on the sound track which can be properly correlated with the motion picture film for correct registration of sound track and film. After the initial slating signals, switches 221 and 222 will normally be opened so as to avoid further marking of the motion picture film.

If during the filming operation any section of the film may require re-doing, it is merely necessary to re-do the section of film corresponding to the interval between two slating signals, the one before and the one after the section in question. For this purpose the pick-up 211 is merely placed on the working recording just before the first slating tone defining the interval in question. This is readily found by means of the increased spacing of the spiral turns of the recording grooves at the positions of the slating signals. After starting to reproduce the recording, switches 221 and 222 are closed and photographing is resumed. The slating lights 223 and 224 will automatically flash when the slating signal occurs at the beginning of the desired portion of the scene. The switches 221 and 222 are kept closed so that the slating lights 223 and 224 will again flash at the end of this portion. This relatively short portion can readily then be substituted for the corresponding portion of original film and properly cut in and registered with the optical sound record of the slating signal as just described.

In this way it is not necessary to re-do the entire sequence corresponding to the recording, but various sections can be re-done when desired. In each instance the performer, knowing where the slating signals were recorded, can pick up the performance from the working recording and can continue the performance as required.

The present invention is also useful in situations where it is desired to cut back and forth between different cameras during the same performance, and permits an extremely simply correlation of the two films so they can be readily spliced together and put in register with the pre-recorded master sound record.

Two slating lamps 223 and 224 are provided so that each can be used with a respective camera. In this way the same scene can be photographed from separate camera angles. The slating signal is inserted at the point of the recording where the director desires to switch cameras. If camera A is running, camera B is started just before the proper signal is reached. Then the slating signal will flash before both cameras, to give an exact indication as to where the new sequence is to be spliced in. Camera A can be stopped as soon as the lamps flash. In this way, the present system affords a simple procedure for cutting in different camera sequences.

This system therefore provides a simple and effective method for registering a motion picture film sequence with a corresponding sound recording and for permitting re-filming of any one or more portions of that sequence and splicing of such re-filmed portion into the whole without any loss of registration and without the necessity for completely re-filming the entire sequence.

What is claimed is:

1. Apparatus for electronic cuing comprising a vertical supporting panel, a sprocketed drum in front of said panel and mounted rotatably relative to said panel, said drum being adapted to engage and to move linearly a pre-recorded magnetic film having sprocket holes, a motor, an operator-controlled electrically-operated clutch coupling said drum to said motor, whereby upon engagement of said clutch said drum is caused to rotate together with said motor, means continuously rotating said motor at a speed adapted to rotate said drum to move said film at a linear speed which is a small fraction of the normal recording speed of said film during its prior recording operation, said drum having a circumference equal to one foot, a revolution counter coupled to said drum to indicate the number of revolutions thereof, whereby said counter serves as a footage indicator to locate any desired portion of said film, said drum having radial-extending indicia indicating equal circumferential portions thereof and serving as footage subdivision indications, a recording head pivotally mounted on said panel and overlying one edge of the cylindrical surface of said drum in operative relation to said film and adjacent one edge thereof outside its sprocket holes and forming a cuing track, an erasing head also pivotally mounted on said panel and similarly overlying said drum in the same operative relation to said tape, operator-controlled solenoid means for pivotally lifting said recording head from said operative position to a non-operative position, means on said recording head cooperating with corresponding means on said erasing head for causing said erasing head to be lifted from its said operative position to a non-operative position simultaneously with the lifting of said recording head by said solenoid means, means for causing said solenoid means and said clutch to be alternately operated, whereby said heads are both lifted from their operative positions relative to said film and drum whenever said clutch is disengaged and are both in operative position whenever said clutch is engaged, a film supply reel on one side of said drum, a film take-up reel on the other side of said drum, take-up motor means coupled to said take-up reel and adapted to traverse said film at a speed higher than said normal recording speed, operator-controlled means for actuating said take-up motor means, a cuing tone oscillator coupled to said recording head, means for effectively disabling said oscillator except when said clutch is engaged, a source of erasing signals adapted to be supplied to said erasing head to erase all magnetic recordings on said cuing track, said erasing head being in advance of said recording head in the direction of travel of said film and operator-controlled means for alternatively energizing said erasing head or said recording head from said oscillator or said source.

2. Apparatus for adding a cuing track to a magnetic tape having a program recorded on portions thereof at a predetermined linear tape speed comprising a tape drive drum adapted to engage said tape and to move it linearly along its length, a motor, a clutch coupled between said motor and said drum, whereby upon engagement of said clutch said drum is caused to rotate together with said motor, means for continuously rotating said motor at a speed adapted to rotate said drum to move said tape at a linear speed which is a small fraction of said predetermined tape speed, a footage indicator coupled to said drum, a pivotally mounted recording head having an operative position overlying the cylindrical surface of said drum in a region of said drum surface where non-recorded portions of said tape are adapted to pass, a pivotally mounted erasing head having an operative position overlying said drum surface region, means for simultaneously moving both said heads from their operative positions to inoperative positions, means for engaging said clutch, means for causing said clutch-engaging means to be alternatively operable with said head-lifting means, whereby whenever said clutch is engaged to drive said drum said heads are caused to be in their said operative positions, and conversely whenever said clutch is disengaged said heads are caused to be in their said inoperative positions, a cuing signal source, an erasing signal source, means alternatively coupling said erasing signal source to said erasing head on said cuing signal source to said recording head.

3. Apparatus for adding a cuing track to a magnetic tape having a program recorded on portions thereof at a predetermined linear tape speed comprising a tape drive drum adapted to engage said tape and to move it linearly along its length, a motor, a clutch coupled between said motor and said drum, whereby upon engagement of said clutch said drum is caused to rotate together with said motor, means for continuously rotating said motor, a pivotally mounted recording head having an operative position overlying the cylindrical surface of said drum in a region of said drum surface where non-recorded portions of said tape are adapted to pass, a pivotally mounted erasing head having an operative position overlying said drum surface region, means for simultaneously moving both said heads from their operative positions to inoperative positions, means for engaging said clutch, means for causing said clutch-engaging means to be alternatively operable with said head-moving means, whereby whenever said clutch is engaged to drive said drum said heads are caused to be in their said operative positions, and conversely whenever said clutch is disengaged said heads are caused to be in their said inoperative positions, a take-up reel for said tape, and take-up motor means coupled to said take-up reel for traversing said tape at a speed higher than said predetermined recording speed whenever said clutch is disengaged.

4. Apparatus for adding a cuing track to a magnetic tape having a program recorded on portions thereof at a predetermined linear tape speed comprising a tape drive drum adapted to engage said tape and to move it linearly along its length, a motor, a clutch coupled between said motor and said drum, whereby upon engagement of said clutch said drum is caused to rotate together with said motor, means for continuously rotating said motor, a pivotally mounted recording head having an operative position overlying the cylindrical surface of said drum in a region of said drum where non-recorded portions of said tape are adapted to pass, a pivotally mounted erasing head having an operative position overlying said drum surface region, means for simultaneously moving both said heads from their operative positions to inoperative positions, means for engaging said clutch, means for causing said clutch-engaging means to be alternatively operable with said head-moving means, whereby whenever said clutch is engaged to drive said drum said heads are caused to be in their said operative positions, and conversely whenever said clutch is disengaged said heads are caused to be in their said inoperative positions.

5. Apparatus for suppressing the dialogue portions of a motion picture sound track recorded on a magnetic-coated film having sprocket holes comprising means for traversing said recorded film at a slow speed which is a small fraction of the original speed of recording of said sound track, means for recording a cuing track at said slow speed on the portion of said film outside said sprocket holes, said cuing track comprising a cuing tone of a predetermined frequency recorded only beside the dialogue portions of said sound track, respective means for reproducing both said sound track and said cuing track at said original speed, and means responsive to said cuing track and tuned to a multiple of said predetermined frequency, which multiple is substantially equal to the reciprocal of said small fraction, for suppressing the output of said sound track reproducing means during the intervals when said cuing tone is being reproduced.

6. Apparatus for suppressing all but desired portions of a pre-recorded record, comprising means for traversing said record at a speed which is a sub-multiple of its original recording speed, means for recording a cuing track at said sub-multiple speed adjacent to and alongside the pre-recorded portions of said record, said cuing track comprising a cuing tone signal of a predetermined frequency recorded only alongside the portions of said pre-recorded record to be suppressed, means for reproducing both said record and said cuing track at said original speed, and means responsive to said reproduced cuing track and tuned to substantially a multiple of said predetermined frequency for suppressing said record reproduction, said frequency multiple being equal to the reciprocal of said speed sub-multiple.

7. Apparatus for controlling reproduction of portions of a record pre-recorded at a predetermined speed comprising means for traversing said record at a speed different from said predetermined speed, means for recording a cuing track at said different speed adjacent to and alongside the pre-recorded portions of said record, said cuing track comprising a cuing tone signal of a predetermined frequency recorded only alongside the portions of said pre-recorded record to be controlled, means for reproducing both said record and said cuing track at said predetermined speed, and means responsive to said reproduced cuing track and tuned to a multiple of said predetermined frequency for controlling reproduction of said record, said multiple frequency having a ratio to said predetermined frequency which ratio is equal to the ratio of said predetermined speed to said different speed.

8. Apparatus for electronically suppressing undesired portions of a record on a recording medium comprising means for recording on said medium beside said record and opposite the portions of said record on said medium which it is desired to suppress, with a cuing signal of predetermined frequency, and at a speed which is a small fraction of the original speed at which said record was recorded. Means for reproducing both said record and said cuing signal at said original speed, and means for passing only portions of said reproduced record which are not coexistent with reproduced cuing signals of a frequency which equals said predetermined frequency multiplied by the reciprocal of said small fraction.

9. Apparatus for separating out desired portions of a record on a recording medium comprising means for recording a cuing track on said medium alongside said original record, said cuing track having one predetermined signal opposite said desired portions of said original record and a different signal opposite the remaining portions of said original record, means for reproducing both said original record and said cuing track, and means for passing only the portions of said original record reproduced simultaneously with said predetermined cuing track while suppressing all portions of said original record reproduced simultaneously with said different cuing track signal.

References Cited in the file of this patent

UNITED STATES PATENTS

| | | |
|---|---|---|
| 2,367,293 | Levinson | Jan. 16, 1945 |
| 2,396,409 | Berzer | Mar. 12, 1946 |
| 2,402,095 | Slyfield | June 11, 1946 |
| 2,558,853 | Kappeler | July 3, 1951 |
| 2,585,913 | Camras | Feb. 19, 1952 |
| 2,611,828 | Gunby | Sept. 23, 1952 |
| 2,628,288 | Blaney | Feb. 10, 1953 |
| 2,647,168 | Rivas | July 28, 1953 |
| 2,649,016 | Fairbanks | Aug. 18, 1953 |
| 2,673,485 | Roderick | Mar. 30, 1954 |
| 2,675,430 | Clarke | Apr. 13, 1954 |
| 2,703,714 | Demby et al. | Mar. 8, 1955 |
| 2,714,202 | Downing | July 26, 1955 |
| 2,725,785 | Templin | Dec. 6, 1955 |
| 2,751,438 | Baer | June 19, 1956 |
| 2,800,531 | Kobler | July 23, 1957 |
| 2,823,268 | Somers | Feb. 11, 1958 |

UNITED STATES PATENT OFFICE

CERTIFICATE OF CORRECTION

Patent No. 3,029,316 April 10, 1962

C Robert Fine

It is hereby certified that error appears in the above numbered patent requiring correction and that the said Letters Patent should read as corrected below.

Column 3, line 44, strike out "along", second occurrence; line 64, for "cusing" read -- cuing --; column 4, line 33, for "one" read -- once --; column 6, line 68, for "feet" read -- foot --; column 7, line 45, for "FIG. 6" read -- FIG. 8 --; column 15, line 4, for "recorded. Means" read -- recorded means --.

Signed and sealed this 21st day of August 1962.

(SEAL)
Attest:

:STON G. JOHNSON
Attesting Officer

DAVID L. LADD
Commissioner of Patents